United States Patent [19]
Morey et al.

[11] 3,866,769
[45] Feb. 18, 1975

[54] WOOD CHIP HANDLING SYSTEM

[75] Inventors: Norval K. Morey, Weidman;
Leward N. Smith, Remus, both of Mich.

[73] Assignee: Morbark Industries, Inc., Winn,. Mich.

[22] Filed: Feb. 20, 1974

[21] Appl. No.: 443,957

[52] U.S. Cl. .................................. 214/44 A, 302/4
[51] Int. Cl. ............................................ B65g 67/26
[58] Field of Search ...... 214/44 R, 44 A, 45; 302/4, 302/9, 10

[56] References Cited
UNITED STATES PATENTS

| | | | |
|---|---|---|---|
| 1,473,815 | 11/1923 | Francke | 214/44 A X |
| 2,634,872 | 4/1953 | Gosse | 214/44 R |
| 2,743,025 | 4/1956 | Manierre | 214/44 A |

Primary Examiner—Robert G. Sheridan
Attorney, Agent, or Firm—Learman & McCulloch

[57] ABSTRACT

A system for handling wood chips wherein an unloader vehicle unloads the chips from a truck trailer or the like to a transfer vehicle, adapted to be positioned adjacent the trailer, and having a roadway on which the unloader vehicle travels as it moves in a to-and-fro path of travel to and from the trailer. The roadway is provided with a grid which supports the unloader vehicle and includes openings therein of such size as to pass free-falling chips deposited by the unloader vehicle. A chip receiving conveyor mechanism is disposed below the grid for receiving the chips and conveying them to the opposite end of the vehicle where they are transferred to a blower which provides a high velocity airstream to carry the chips to, and pile them at, a remote location.

5 Claims, 3 Drawing Figures

PATENTED FEB 18 1975

3,866,769

WOOD CHIP HANDLING SYSTEM

BACKGROUND OF THE INVENTION

This invention relates to wood chip handling apparatus and more particularly to apparatus for receiving wood chips and discharging them via a high velocity airstream to a wood chip pile. Such apparatus is particularly adapted for use with a wood chip unloading system which unloads wood chips from a chip-carrying van or the like, and stock piles them in huge piles.

Tree harvesting apparatus, such as that disclosed in U.S. Pat. No. 3,661,333, granted May 9, 1972, and incorporated herein by reference, is generally moved to the tree-felling site where it economically and quickly reduces an entire tree, including the truck and limbs, to chips. The tree harvesting apparatus is generally moved to the site where the trees are felled. Although the tree harvesting apparatus has the capability of blowing the chips into a stock-pile at the tree felling site, generally the chips are blown into vans or box-type trailers and moved thereby to chip collection centers at pulp mills and the like. Such enclosed trailers or vans are generally drawn by truck or tractor to the chip collecting center. The chips cannot merely be dumped from the vans because they must be piled in large stock piles and, moreover, because the vans or trailers commonly employed to haul chips are general utility trailers which do not have dumping mechanisms.

When vans are utilized to transport chips to a central chip collecting center, the loading of the vans must be synchronized with the unloading of the vans. It is convenient and efficient for the drivers of the tow trucks or tractors to unhook the trailing vans at the chip collecting center and return the tow trucks to the tree-felling site for connection to other vans filled by the tree harvesting apparatus. Accordingly, it is important that the apparatus for piling chips be portable so that it can be successively moved to a position adjacent each of the vans or trailers to be unloaded and that it have the capability of blowing chips to the top of a big pile.

Apparatus constructed in accordance with the present invention contemplates a portable lift truck or tractor which scoops buckets of chips from the van and dumps the chips into collecting apparatus constructed according to the present invention. Such collecting apparatus includes a portable framework mounting a trackway platform on which the portable lift truck rides as it moves out of the van or trailer being unloaded. The platform includes vertical openings therein of such size as to vertically pass chips deposited by the unloading truck. Conveyor mechanism is provided for receiving the dumped chips after they pass through the grid and conveying them to the opposite end of the framework where they are received by a blower and dispatched via an airstream to a stockpile.

The present invention may more readily be understood by reference to the accompanying drawings, in which.

Figure 1:
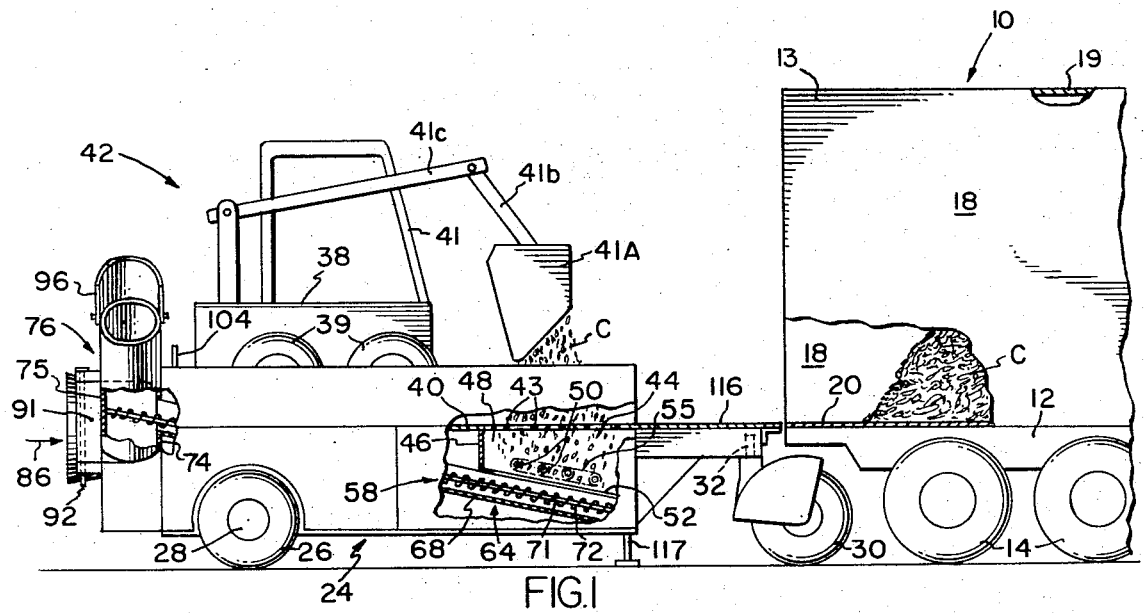
FIG. 1 is a side elevational view illustrating chip dispatching apparatus constructed according to the present invention disposed adjacent a chip hauling van, parts of the van and chip dispatching apparatus being broken away to more clearly illustrate other parts thereof.

Apparatus constructed according to the present invention is particularly adapted for use with a chip receiving trailer, generally designated 10, having a frame 12, mounting road engageable wheels 14, as usual. The frame 12 mounts a rearwardly opening van body 13, having side walls 18, a top wall 19, and a bottom wall 20, that is filled with wood chips C for transportation from a tree-felling and chipping site to a chip collection center. The trailer 12 may suitably be of the type which is removably coupled behind a tow truck or tractor.

Apparatus constructed according to the present invention includes a chassis or framework generally designated 24, which defines a hollow material receiving chamber mounting a pair of road engageable rear wheels 26 via axles 28 as usual. Swivelably mounted for rotation in a 360° path represented by the chain line 36 (FIG. 2), about a king pin 32 at the front of the framework 24, is a single wheel 30. The framework 24 includes upstanding side walls 37 spanned by an elevated roadway platform or deck, generally designated 40, which constitutes the top wall of the material receiving chamber and which is adapted to support a chip unloading vehicle, such as a small sized front end loader generally designated 42.

The vehicle 42 includes a frame 38, mounted on road engageable wheels 39 and having a cab 41 thereon in which a driver is seated. A vertically movable and swingable chip bucket 41A is mounted on the cab 41 via motor driven linkage 41b - 41c for scooping the chips C out of the van 13. The vehicle 42 is of such size and turning radius that it moves in a to-and-fro path to move into and out of the trailer 16.

The roadway 40 includes, at the front end of the frame, a series of longitudinally spaced grid bar members 43 for supporting the vehicle 42, which have chip receiving openings 44 therebetween of such size as to permit the passage of wood chips, generally designated C, deposited by the vehicle 42, when the vehicle 42 is in the position illustrated in FIG. 1.

A chip receiving funnel or hopper, generally designated 46, is disposed on the framework 24 beneath the grid members 43 and includes side walls 48 spanned by a vertically inclined bottom wall 52. A plurality of augers or screw conveyors 50 are journaled in the side walls 37 at the bottom of the hopper 46 for augering the chips C laterally to one side of the framework 24. Each conveyor 50 is horizontally disposed but is at a slightly higher level than the conveyor 50 ahead of it (see FIG. 1). A hydraulic motor 54 is mounted on one of the side walls 37 and drives a chain 55 trained around sprocket wheels 55a mounted on the ends of the augers 50. The bottom hopper wall 52 terminates short of one side wall 37 to permit the laterally moved chips C to be deposited on a front-to-rear conveyor, generally designated 58, extending along one side wall 37.

The conveyor 58 includes a vertically inclined, upwardly opening, rearwardly flaring conveyor trough 64 having side walls 66 spanned by a bottom wall 68. The conveyor 58 includes a pair of oppositely rotating, material forwarding augers 70 driven by a drive member, generally designated 73. The augers 70 include shafts 71 journaled in bearing blocks 69 and mounting helical flights 72 of opposite hand thereon.

Figure 3:
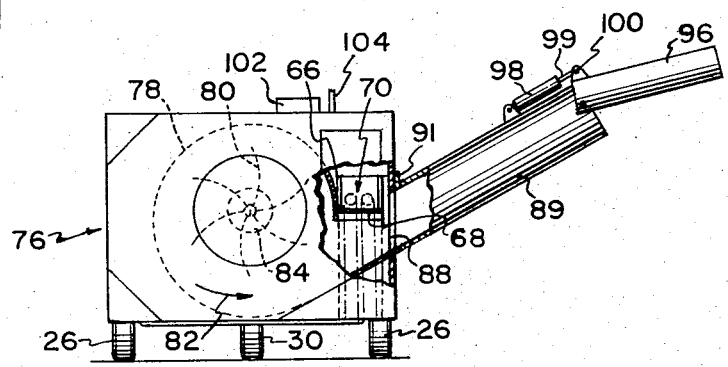
FIG. 3 is a rear end elevational view.

Disposed at the rear of the framework 24 is a blower housing, generally designated 76, including upstanding front and rear walls 74 and 75 spanned by an annular side wall 78. A blower or fan blade structure 80 is centrally mounted on the blower housing for creating a high velocity airstream, represented by the arrow 82, when driven by a blower motor 84. The blower 80 axially sucks air into the housing, in the direction represented by the arrow 86 and then discharges it circumferentially in the direction represented by the arrow 82, to a discharge blower outlet 88 (FIG. 3) at one side of the housing 76.

The lower wall 68 of the front-to-rear conveyor 58 lies in a plane which intersects the outlet 88. The flights 72 on the front-to-rear conveyor shafts 71 terminate midway between the blower housing front and rear walls 74 and 75 so that any stringy chip material will be positively conveyed to a position in the path of the airstream 82.

Figure 2:
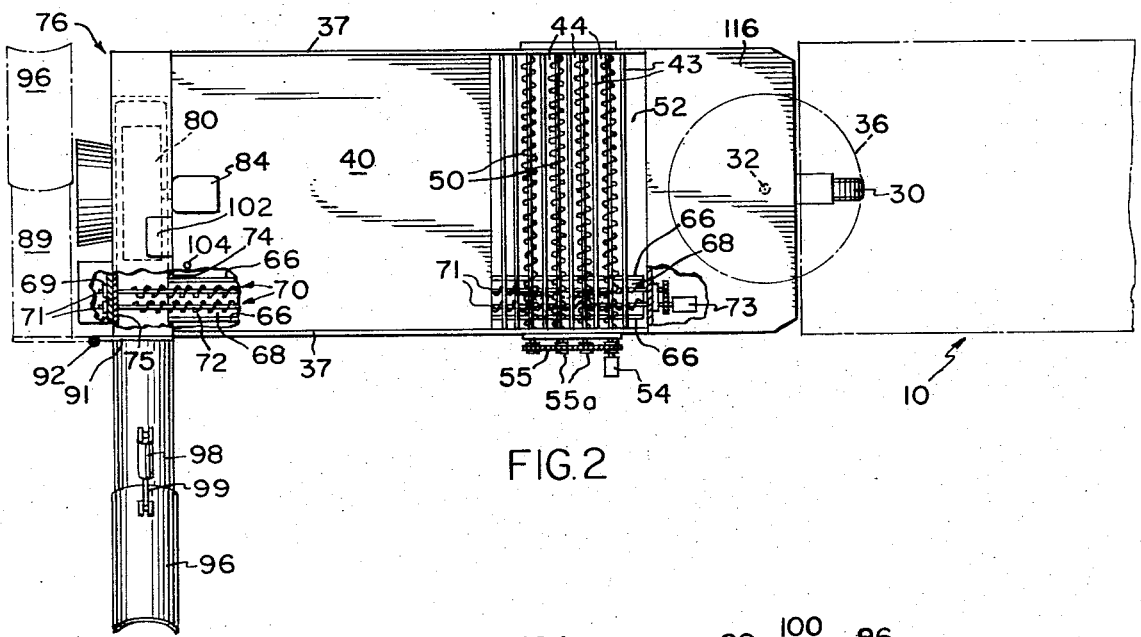
FIG. 2 is a top plan view of the apparatus illustrated in FIG. 1.

A blower pipe 89 is pivotally mounted on one of the side walls 37 via a pivot pin 92 for swinging movement between the stowed position illustrated in chain lines in FIG. 2, and the operative position illustrated in solid lines in FIG. 2, in alignment with the blower outlet 88.

The blower pipe 89 includes an annular mounting flange 91 having an opening therein which matches the opening in the blower outlet 88. A chip directing spout 96 is adjustably mounted on the end of the blower pipe 89 for directing chips in any one of a plurality of different paths of travel. A double acting, fluid operated, solenoid actuated cylinder 98 is mounted on the tubular member 89 and includes a piston 99 pivotally connected via a pivot pin 100 to the chip directing spout 96. An operator's chair 102 and controls, generally designated 104, for operating the various conveyors 50, 70 and blower unit 80, may be mounted atop the blower housing unit.

A loading support ramp 116 is mounted at the front of the frame 24 for supporting the lift truck 42 as it travels between the chip dispatcher and the van 16. Also, a pair of ground engageable, hydraulically operated stabilizers or jacks 117 are provided on opposite sides of the framework 24 for adjusting the height of the plate 116 so that it will be at substantially the same level as the bottom trailer wall 20.

THE OPERATION

First of all, the vehicle frame 24, carrying the lift truck 42, is moved to a position adjacent the rear of the van 16 and the jacks 117 are adjusted so that the level of loading ramp 116 is at the level of the lower van wall 20. The unloading truck 42 is then driven on the roadway 40 into the van 16 to "scoop up" a bucket of chips C via the bucket 41A. The vehicle 42 is reversely driven out of the trailer, over the ramp 116 and the grid members 43 to a position at the rear of the roadway 40. The vehicle 42 then dumps the chips C onto the grate bars 43 and they pass through the openings 44 to the underlying transversely disposed conveyors 50. Conveyors 50 convey the chips laterally to the conveyor augers 70 which convey the chips rearwardly and deposit them in the transversely moving airstream 82 to be carried thereby to the pile. Apparatus constructed according to the present invention can handle huge volumes of chips per minute and pile them in a pile which might typically be 100 to 200 feet high and ½ a mile long. Such a pile would comprise many tons of chips.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Apparatus for unloading and piling particulate material, such as wood chips or the like from a load carrying vehicle having a load supporting floor, said apparatus comprising a material handling vehicle having frame means defining a material handling chamber, deck means on said frame means extending at a level above the chamber longitudinally fore and aft of said handling vehicle, means for vertically positioning the forward end of said deck means at the level of the floor of a load carrying vehicle, means defining an opening through said deck means through which material may be dropped into said chamber, said deck means including wheel support portions extending along the sides of said chamber forming elongate, fore and aft extending supports for the wheels of an auxiliary material carrying vehicle such as a front end loader to enable it to move back and forth lengthwise of said deck means across said opening to and from a rearward end limit in which said auxiliary vehicle is positioned to dump material through said opening into said chamber, blower means at the rearward end of said handling vehicle for blowing material from said chamber, and conveying means in said chamber for conveying material introduced into said chamber through said opening to said blower means.

2. Apparatus as defined in claim 1 further comprising upstanding side walls extending along opposite longitudinal sides of said deck for confining said auxiliary vehicle to essentially fore and aft movement along said deck.

3. Apparatus as defined in claim 1 wherein said means defining said opening comprises a grid section extending across the entire transverse width of said deck, first transversely extending conveying means underlying said grid section for conveying material to one side of said chamber, and second longitudinally extending conveying means for receiving material from said first conveying means and transporting said material to said blower means.

4. Apparatus as defined in claim 1 wherein said conveyor means includes an enclosed screw conveyor feeding said blower means, said screw conveyor having a screw of constant diameter and a housing of a diameter increasing toward the discharge end of the screw conveyor.

5. Apparatus as defined in claim 1 in which said means for vertically positioning the deck means includes a vertically adjustable jack also serving to stabilize the vehicle during the unloading operation.

* * * * *